March 31, 1931. H. M. TOPPIN 1,798,234
KEY HOLDER FOR TOOLS
Filed Dec. 5, 1928
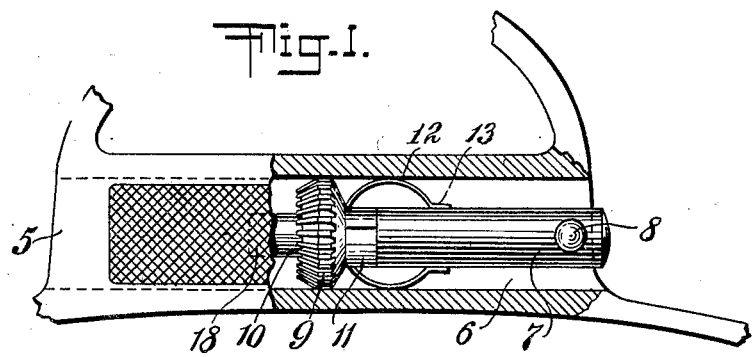
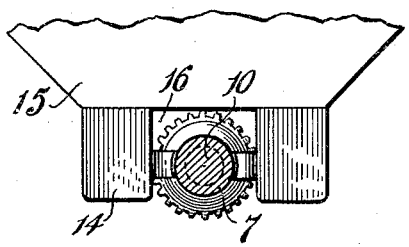
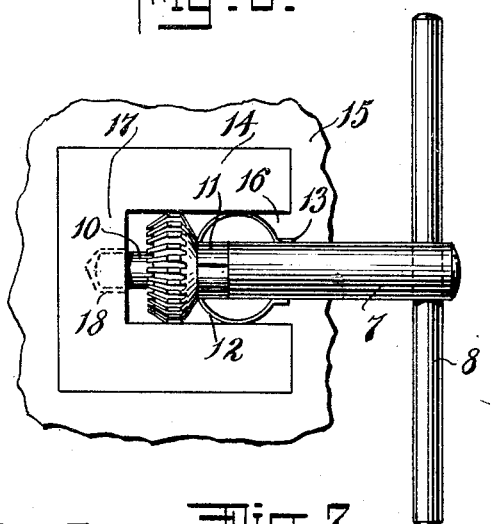
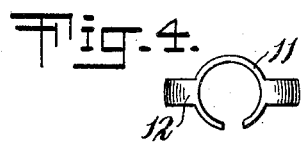
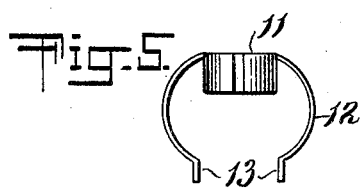
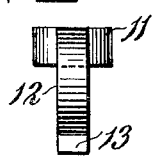
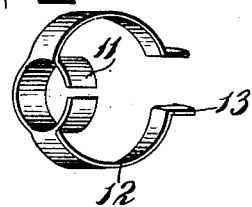
INVENTOR
Hubert M. Toppin
by
Arthur B. Jenkins,
ATTORNEY Patented Mar. 31, 1931

1,798,234

UNITED STATES PATENT OFFICE

HUBERT M. TOPPIN, OF WEST HARTFORD, CONNECTICUT, ASSIGNOR TO THE JACOBS MANUFACTURING COMPANY, OF HARTFORD, CONNECTICUT, A CORPORATION OF CONNECTICUT

KEY HOLDER FOR TOOLS

Application filed December 5, 1928. Serial No. 323,981.

My invention relates to that class of devices that are employed for holding a key or other device used in connection with various tools to loosen or tighten various parts thereon, as for attaching members thereto or removing them therefrom, and an object of my invention, among others, is the production of a holder that shall be simple in construction and patricularly efficient for the purpose for which it is designed.

One form of a holder embodying my invention and in the construction and use of which the objects herein set out, as well as others, may be attained, is illustrated in the accompanying drawings, in which—

Figure 1 is a view in section of a portion of the handle of an electric drill selected for the purpose of illustrating my invention.

Figure 2 is a detail view illustrating the manner or use of my improved holder in connection with a different tool, the handle of the tool being broken off.

Figure 3 is a view looking from a point located at right angles to the point of view of Figure 2.

Figure 4 is a detail end view of the holder.

Figure 5 is a side view of the same.

Figure 6 is an edge view.

Figure 7 is an isometric view.

My improved holder is not limited in its use to holding a tool of any particular kind nor to retain it in any particular position but as it is well adapted for the purpose of holding a key such as is employed in connection with drills or other machine tools for the purpose of loosening and tightening chuck jaws for holding drills, a machine tool embodying such a manner of use is illustrated in the drawings herein in which the numeral 5 indicates generally the handle of a machine tool, as that of a power drill, in connection with which, as will be well understood, there is a chuck for holding a drill, the jaws of which chuck are operated as by means of a key. A pocket 6 is formed in this handle in which the key for operating the chuck is contained, this key, in the tool herein shown, embodying a shank or stem 7 having a handle 8 by means of which it may be turned, a pinion 9 adapted for use in a manner that will be well understood by those skilled in the art, and a stud 10 projecting from the end of the pinion to engage a recess for the purpose of holding the pinion 9 in engagement with a pinion of the chuck for the purpose of rotating the latter for operation of the chuck jaws.

In carrying my invention into effect, I provide a holder that may be readily formed as from sheet metal, this holder being so constructed that it may be easily applied to the key or as readily removed therefrom. The holder is constructed to exert a frictional action against the parts with which it is engaged to retain the key in place.

As illustrated herein this holder is shaped from a flat piece of sheet metal and it comprises a band 11 bent into the form of a ring with its adjacent edges slightly separated, and when so bent the band is adapted to fit quite snugly the shank or stem 7 of the tool. Fingers 12 are integrally formed with the band 11 and project from one edge thereof, the ends 13 of the fingers being located a distance apart less than the diameter of the part, as the shank 7 of a tool, which they are to engage. These ends 13 are also preferably curved or shaped to fit the part with which they are to engage.

When a tool, as a key, is located as in a pocket 6 the fingers 12, that are bowed, will exert such pressure against the wall of the pocket as to prevent the key from being accidentally removed therefrom, while at the same time, the friction will not be so great as to prevent the tool from being intentionally removed therefrom.

In the device shown in Figure 2 lugs 14 extending from the sides of the head 15 of a machine tool provide a recess 16 having a bottom 17 in which the key may be placed, the fingers in this connection exerting their frictional hold against the facing surfaces of the lugs or walls of the recess. In this manner of use the stud 10 on the key is located in a hole 18 in the bottom 17 of the recess 16, as shown in Figure 3, the fingers exerting their frictional hold against the sides of the recess and the stud in the hole preventing lateral movement of the key.

It will be seen that the holder is such that it may be readily formed in a comparatively inexpensive manner from sheet metal, that it may be readily applied to or removed from a tool, and when so applied, it will most efficiently retain the key or other device in place.

While I have illustrated and described herein a holder comprising two spring fingers, this being the preferred form of construction, it will be observed that this number may be increased or lessened, and even one spring finger will serve the purpose provided the stud 10 fits the hole 18 and the pinion 9 fits the hole 6 sufficiently close, while permitting ready removal, to resist the pressure of the spring against the wall of the hole 6.

In accordance with the provisions of the patent statutes I have described the principles of operation of my invention, together with the device which I now consider to represent the best embodiment thereof; but I desire to have it understood that the device shown is only illustrative, and that the invention may be carried out by other means and applied to uses other than those above set out.

I claim:

1. A tool holder comprising a crosswise split band formed to encircle a tool, and a spring finger bowed from its point of attachment to said band for frictional engagement with a wall of a recess in which said tool may be located.

2. A tool holder comprising a band formed to encircle a tool for attachment thereto, and a spring finger bowed laterally from its point of connection with said band for frictional engagement with a wall of a recess in which said tool may be located.

3. A tool holder comprising a crosswise split band formed to encircle a tool for removable attachment thereto, and a spring finger projecting from said band for frictional engagement with a wall of a recess in which said tool may be located and for engagement with the tool.

4. A tool holder comprising a band formed to encircle a tool, and a bowed spring finger projecting laterally from said band with its outer end resting against the tool to create spring action for frictional engagement with a wall of a recess in which said tool may be located.

5. A tool holder comprising a crosswise split band formed to encircle a tool and bowed spring fingers projecting radially from the points of attachment with said band on diametrically opposite sides thereof for frictional engagement with a wall of a recess in which said tool may be located.

6. A device having a recess, a tool for use in connection with said device, and a holder comprising a crosswise split band formed to encircle said tool and a spring finger bowed from its point of connection with and backwardly over said band for frictional engagement with a wall of a recess in which said tool may be located intermediate its ends and the tool at its free end.

HUBERT M. TOPPIN.